(12) United States Patent
Groh et al.

(10) Patent No.: US 11,262,201 B2
(45) Date of Patent: Mar. 1, 2022

(54) LOCATION-BASED VEHICLE OPERATION

(71) Applicant: Ford Global Technologies, LLC, Dearborn, MI (US)

(72) Inventors: Alexander Groh, Detroit, MI (US); Clifton Thomas, Palo Alto, CA (US); Joseph Gifford, Ferndale, MI (US); Jeremy Lerner, Oak Park, MI (US); Taylor Hawley, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 258 days.

(21) Appl. No.: 16/553,470

(22) Filed: Aug. 28, 2019

(65) Prior Publication Data

US 2021/0063167 A1 Mar. 4, 2021

(51) Int. Cl.
*G01C 21/32* (2006.01)
*B60R 21/0136* (2006.01)
*B60W 40/09* (2012.01)
*G01C 21/36* (2006.01)

(52) U.S. Cl.
CPC .......... *G01C 21/32* (2013.01); *B60R 21/0136* (2013.01); *B60W 40/09* (2013.01); *G01C 21/36* (2013.01)

(58) Field of Classification Search
CPC .... G01C 21/32; G01C 21/36; B60R 21/0136; B60W 40/09

USPC ........................................................ 701/532
See application file for complete search history.

(56) References Cited

U.S. PATENT DOCUMENTS

| | | | |
|---|---|---|---|
| 9,268,332 B2 | 2/2016 | Montemerlo et al. | |
| 10,699,571 B2 * | 6/2020 | Vora ................. | G08G 1/096833 |
| 2017/0236210 A1 | 8/2017 | Kumar et al. | |
| 2018/0113474 A1 | 4/2018 | Koda et al. | |
| 2018/0217600 A1 | 8/2018 | Shashua et al. | |
| 2018/0266833 A1 | 9/2018 | Carlson et al. | |

* cited by examiner

*Primary Examiner* — Gertrude Arthur Jeanglaude
(74) *Attorney, Agent, or Firm* — Frank A. MacKenzie; Bejin Bieneman PLC

(57) ABSTRACT

A vehicle can be operated in an identified map area. Output is obtained from a first classifier, based on input including the map area and one or more current environmental conditions detected in the map area, specifying a first probability that the map area is currently available for sensing to support input-free operation of the vehicle. Then, if and only if the first probability indicates that the map area is currently available for sensing to support input-free operation of the vehicle, output is obtained from a second classifier, based on input including the map area and the one or more current environmental conditions, specifying a second probability that the vehicle will traverse the map area without a minimum risk maneuver event. Then, if and only if the second probability indicates that the vehicle will traverse the map area without a minimum risk maneuver event, operating the vehicle in an input-free mode in the map area.

20 Claims, 5 Drawing Sheets

LOCATION-BASED VEHICLE OPERATION

BACKGROUND

The Society of Automotive Engineers (SAE) has defined multiple levels of vehicle automation. At levels 0-2, a human driver monitors or controls the majority of the driving tasks, often with no help from the vehicle. For example, at level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances with human supervision but without direct human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention.

DETAILED DESCRIPTION

Figure 1:
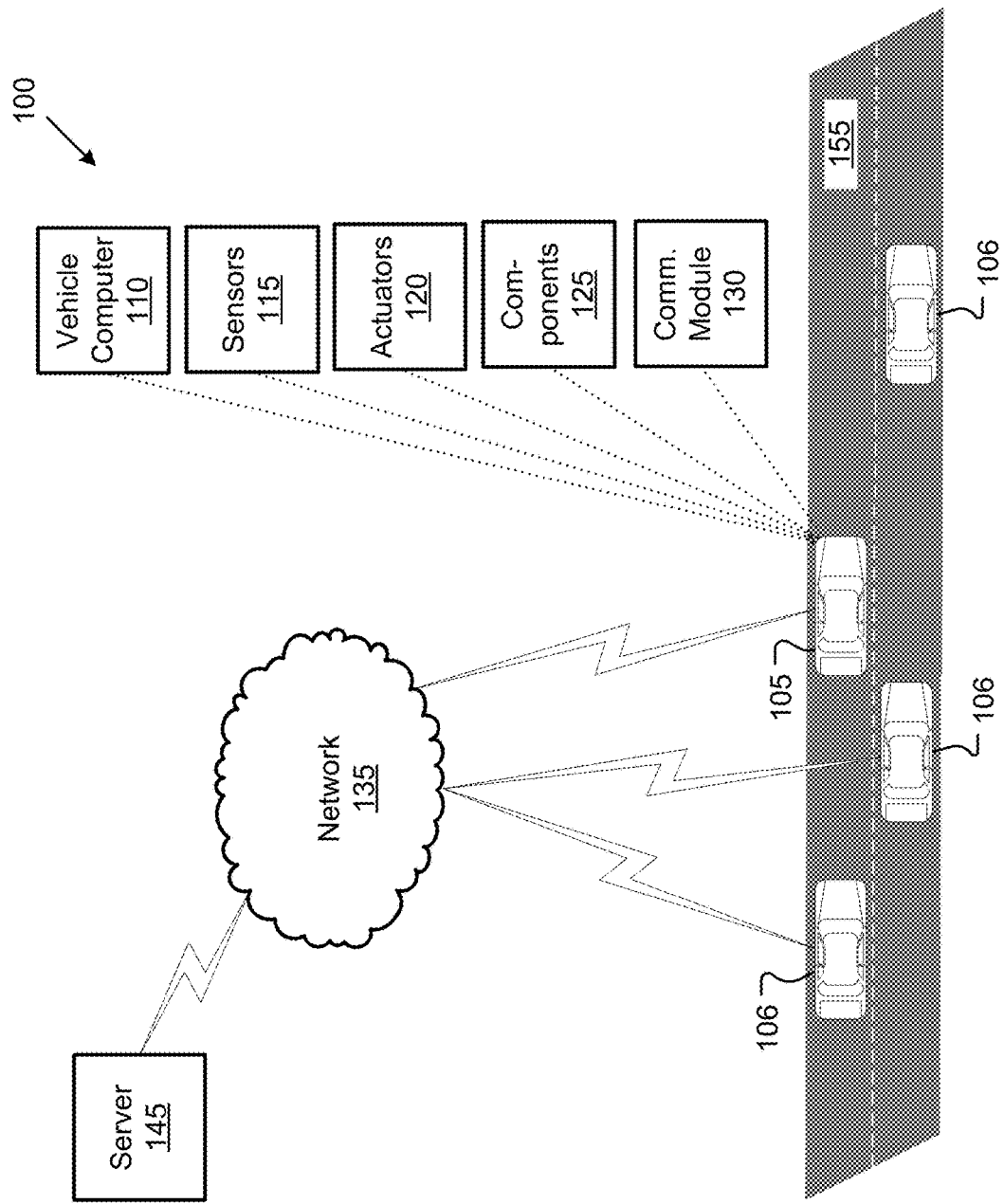
FIG. 1 is a diagram illustrating an example vehicle navigation and control system.

A method, comprises operating a vehicle in an identified map area; obtaining output from a first classifier, based on input including the map area and one or more current environmental conditions detected in the map area, specifying a first probability that the map area is currently available for sensing to support input-free operation of the vehicle; then, if and only if the first probability indicates that the map area is currently available for sensing to support input-free operation of the vehicle, obtaining output from a second classifier, based on input including the map area and the one or more current environmental conditions, specifying a second probability that the vehicle will traverse the map area without a minimum risk maneuver event; and then, if and only if the second probability indicates that the vehicle will traverse the map area without a minimum risk maneuver event, operating the vehicle in an input-free mode in the map area.

The method can further comprise providing the one or more current environmental conditions to a remote server for updating the first classifier and the second classifier.

The method can further comprise providing a detected minimum risk maneuver event to a remote server for updating the first classifier and the second classifier.

The method can further comprise ending the input-free mode upon a detected minimum risk maneuver event.

The first classifier and the second classifier can include different weights for different environmental conditions. The first classifier and the second classifier can accept vehicle state data as input in addition to the one or more current environmental conditions. The first classifier and the second classifier can accept a type of sensor as input in addition to the one or more current environmental conditions. The first classifier and the second classifier can are outputs from a trained neural network.

The one or more environmental conditions can be one and only one environmental condition. The one or more environmental conditions can include at least one of an air temperature, a wind speed, a wind direction, an amount of ambient light, a presence or absence of precipitation, a rate of precipitation, or a presence or absence of atmospheric occlusions affecting visibility.

A computer comprises a processor and a memory, the memory storing instructions executable by the processor such that the computer is programmed to operate a vehicle in an identified map area; obtain output from a first classifier, based on input including the map area and one or more current environmental conditions detected in the map area, specifying a first probability that the map area is currently available for sensing to support input-free operation of the vehicle; then, if and only if the first probability indicates that the map area is currently available for sensing to support input-free operation of the vehicle, obtain output from a second classifier, based on input including the map area and the one or more current environmental conditions, specifying a second probability that the vehicle will traverse the map area without a minimum risk maneuver event; and then, if and only if the second probability indicates that the vehicle will traverse the map area without a minimum risk maneuver event, operate the vehicle in an input-free mode in the map area.

The instructions can further comprise instructions to provide the one or more current environmental conditions to a remote server for updating the first classifier and the second classifier.

The instructions can further comprise instructions to provide a detected minimum risk maneuver event to a remote server for updating the first classifier and the second classifier.

The instructions can further comprise instructions to end the input-free mode upon a detected minimum risk maneuver event.

The first classifier and the second classifier can include different weights for different environmental conditions. The first classifier and the second classifier can accept vehicle state data as input in addition to the one or more current environmental conditions. The first classifier and the second classifier can accept a type of sensor as input in addition to the one or more current environmental conditions. The first classifier and the second classifier can are outputs from a trained neural network.

The one or more environmental conditions can be one and only one environmental condition. The one or more environmental conditions can include at least one of an air temperature, a wind speed, a wind direction, an amount of ambient light, a presence or absence of precipitation, a rate of precipitation, or a presence or absence of atmospheric occlusions affecting visibility.

FIG. 1 is a block diagram of an example vehicle control system 100. The system 100 includes a vehicle 105, which is a land vehicle such as a car, truck, etc. The vehicle 105 includes a vehicle computer 110, vehicle sensors 115, actuators 120 to actuate various vehicle components 125, and a vehicle communications module 130. Via a network 135, the communications module 130 allows the vehicle computer 110 to communicate with a central server 145 and/or one or more second vehicles 106.

The vehicle computer 110 includes a processor and a memory. The memory includes one or more forms of computer-readable media, and stores instructions executable by the vehicle computer 110 for performing various operations, including as disclosed herein.

The vehicle computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicles 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the vehicle computer 110, as opposed to a human operator, is to control such operations. Additionally, the vehicle computer 110 may be programmed to determine whether and when a human operator is to control such operations.

The vehicle computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the vehicle computer 110 may communicate, via the vehicle 105 communications module 130, with a navigation system that uses the Global Position System (GPS). As an example, the vehicle computer 110 may request and receive location data of the vehicle 105. The location data may be in a known form, e.g., geo-coordinates (latitudinal and longitudinal coordinates).

The vehicle computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

The computer 110 can include programming to operate the vehicle 105 in one or more assist modes, an assist mode being a mode of operation of the vehicle 105 that can also be referred to as an input-free mode because in such mode the computer 110 controls one or more of steering, braking, and acceleration or speed control that otherwise, e.g., by default, could be controlled by input from a human driver. For example, technology currently exists, and further technology is likely to be developed, for assist modes in which a vehicle 105 computer 110 can control a speed of a vehicle 105 (e.g., adaptive cruise control systems that are input-free with respect to an accelerator and brake) and/or vehicle 105 steering (e.g., hands-free driving systems) based at least in part on data from sensors 115.

Via the vehicle 105 communications network, the vehicle computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the vehicle computer 110 actually comprises a plurality of devices, the vehicle 105 communications network may be used for communications between devices represented as the vehicle computer 110 in this disclosure. Further, as mentioned below, various controllers and/or vehicle sensors 115 may provide data to the vehicle computer 110.

Vehicle sensors 115 may include a variety of devices such as are known to provide data to the vehicle computer 110. For example, the vehicle sensors 115 may include Light Detection And Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105, including objects on and/or conditions of a roadway 155. As another example, one or more radar sensors 115 fixed to vehicle 105 bumpers may provide data to provide and range velocity of objects (possibly including second vehicles 106), etc., relative to the location of the vehicle 105. The vehicle sensors 115 may further alternatively or additionally, for example, include camera sensor(s) 115, e.g. front view, side view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation-such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the vehicle computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications to another vehicle, to a road-side infrastructure node and/or (typically via the network 135) a remote server 145. The module 130 could include one or more mechanisms by which the vehicle computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short range communications (DSRC), and/or wide area networks (WAN), including the Internet, providing data communication services.

The network 135 includes one or more mechanisms by which a vehicle computer 110 may communicate with an infrastructure node, a central server 145, and/or a second vehicle 106. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The server 145 can be a conventional computing device, i.e., including one or more processors and one or more memories, programmed to provide operations such as disclosed herein. Further, the server 145 can be accessed via the network 135, e.g., the Internet or some other wide area network.

A vehicle computer 110 can receive and analyze data from sensors 115 substantially continuously, periodically, and/or when instructed by a server 145, etc. Further, conventional object classification or identification techniques can be used, e.g., in a computer 110 based on lidar sensor 115 camera sensor 115, etc., data, to identify a type of object, e.g., vehicle, person, rock, pothole, bicycle, motorcycle, etc., as well as physical features of objects.

Various techniques such as are known may be used to interpret sensor 115 data. For example, camera and/or lidar image data can be provided to a classifier that comprises programming to utilize one or more conventional image classification techniques. For example, the classifier can use a machine learning technique in which data known to represent various objects, is provided to a machine learning program for training the classifier. Once trained, the classifier can accept as input an image and then provide as output, for each of one or more respective regions of interest in the image, an indication of one or more objects or an indication that no object is present in the respective region of interest. Further, a coordinate system (e.g., polar or cartesian) applied to an area proximate to a vehicle 105 can be applied to specify locations and/or areas (e.g., according to the vehicle 105 coordinate system, translated to global latitude and longitude geo-coordinates, etc.) of objects identified from sensor 115 data. Yet further, a computer 110 could employ various techniques for fusing (i.e., incorporating into a common coordinate system or frame of reference) data from different sensors 115 and/or types of sensors 115, e.g., lidar, radar, and/or optical camera data.

Data from sensors 115 can be used by a vehicle 105 computer 110 to determine whether the computer 110 can operate the vehicle 105 without inputs that would otherwise be provided by a vehicle 105 occupant. For example, the computer 110 may determine to operate the vehicle 105 without requiring an occupant's hands to be on a vehicle 105 steering wheel (or other steering control). The computer 110 can receive a determination as to the availability of input-free operation, for example, from existing algorithms that based on a map of a road segment as input, and localizes the vehicle 105 on the map using a most probable path to preview the next upcoming road segments with hands-free driving availability.

Figure 2:
FIG. 2 illustrates an example environmental conditions map.

FIG. 2 illustrates an example environmental conditions map 200. The map 200 can be stored in a memory of a vehicle computer 110 and/or a memory of a server 145. For example, the server 145 can store and update the environmental conditions map 200 on a periodic basis, e.g., hourly.

In the present context, an "environmental condition" is a characteristic or attribute of an ambient environment that can be described by a quantitative or numeric measurement, e.g., an air temperature, a wind speed and/or direction, an amount of ambient light (e.g., in lumens), a presence or absence of one or more types of precipitation (e.g., binary value(s) representing respective presence(s) or absence(s) of rain, snow, sleet, etc.), a rate of precipitation (e.g., a volume or depth of precipitation being received per unit of time, e.g., amount of rain per minute or hour), presence or absence of atmospheric occlusions that can affect visibility, e.g., fog, smoke, smog, a level of visibility (e.g., on a scale of 0 to 1, 0 being no visibility and 1 being unoccluded visibility), etc.

In the present context, a "map" is a set of data, which can be referred to as map data, specifying physical features, e.g., roads, highways, bridges, buildings, lakes, ponds, rivers, etc., at respective locations, e.g., latitude and longitude geo-coordinates. A computer 110, 145 can store map data as is conventionally known, e.g., for use in a vehicle 105 navigation system or the like.

An environmental condition map 200 includes conventional map data as just described, and additionally specifies one or more environmental conditions, i.e., environmental conditions data, at each of a plurality of respective reference locations 205 on a map. For example, FIG. 2 shows a map 200 with a plurality of dots (only one of which is labeled with the reference number 205 for ease of illustration), each of which serves as a reference location 205. Accordingly, the environmental condition map 200 can include data specifying a plurality of environmental conditions, each of the specified environmental conditions being specified as pertaining to a reference location 205. That is, environmental condition map 200 can include zero, one, or a plurality of environmental conditions specified for each reference location 205.

Each reference location 205 can be defined to be a centroid of a square or other area included in the map 200. In the example of FIG. 2, the reference locations 205 are equidistant from one another, and therefore define square areas of equal size to one another on the map 200. Environmental conditions specified for a reference location 205 can then be considered to be specified for the map area, e.g., the square area, for which the reference location 205 is the centroid. Further, the map 200 can include, for each reference location 205, a specification that the area defined by the location 205 is or is not available for input-free operation. For example, a map 200 could include areas having road segments known to be inappropriate for input-free operation due to various factors, e.g., a road grade, a number or degree of curves, a lack of lane markings, structures such as tunnels or bridges, etc.

Roads and/or road segments (including highways, roads, city streets, etc.) are physical features that can be included in map data. A road segment is defined in the present context as a segment or portion of a road within a specified map area, e.g., a map area defined with respect to a reference location 205 as just described.

The computer 110 can be programmed to implement two probabilistic classifiers to evaluate road segments. The classifiers can include a deep neural network as discussed below.

A first classifier can determine a probability that environmental conditions are affecting operation of vehicle 105 sensors 115, e.g., a probability that completeness or clarity (or lack thereof) of sensor 115 data is a result of environmental conditions as opposed to a defect or fault in a sensor 115 (that is, in lay terms, as opposed to the sensor 115 not working properly for some reason). Put another way, the first classifier can determine whether a road in a map area for a reference location 205 is available for hands-free driving, i.e., whether sensor 115 data is determined to be available, given environmental conditions and other factors such as vehicle 105 state, for input-free driving.

For example, assume that sensors 115 provide data indicating environmental conditions including precipitation, that the precipitation is rain, and specify an amount of the rain. Further assume that under these environmental conditions sensors 115 are not expected to be able to determine road lane markings. In this example, the first probabilistic classifier should then provide a relatively low probability that a road segment including these environmental conditions is available for input-free operation. On the other hand, if the first probabilistic classifier provides a relatively high probability that a road segment including a set of environmental conditions (e.g., no precipitation, high level of ambient light) is available for input-free operation, then if a computer 110 cannot identify lane markings from sensor 115 data, the computer 110 may determine that one or more sensors 115 in a vehicle 105 are experiencing a defect or fault.

A naïve version of the first classifier is shown in Equation 1a.

$$P(Neg_{cur} \mid Env, seg) = \frac{\Sigma Neg_{pr\_Env}}{\Sigma Trips_{pr\_Env}} \quad (1a)$$

That is, the first classifier can determine a probability P of a current determination $Neg_{cur}$ that a road segment seg is not available for input-free operation given a set of one or more environmental conditions Env in the segment. $\Sigma Neg_{prev\_Env}$ is a number (typically a sum, as indicated) of previous negative determinations of the road segment as available for input-free operation (i.e., a number of prior determinations that the segment was not available for input-free operation) given the set of environmental conditions Env, and is divided by a total number of prior trips $\Sigma Trips_{pr\_Env}$ through the segment for which a determination of availability for input-free operation was made given the set of environmental conditions Env. Equation 1a shows a naïve version of the first classifier, i.e., a version that does not weight or discriminate between different environmental conditions in the set of environmental conditions Env, but rather simply determines a probability $Neg_{cur}$ of the determination assuming that the specified set of environmental conditions Env exists.

An advanced version of the first classifier is shown in Equation 1b.

$$P(Neg_{cur} \mid Env, seg) = \quad (1b)$$
$$w_1 \frac{\Sigma Neg_{pr\_Env\_1}}{\Sigma Trips_{pr\_Env\_1}} + w_2 \frac{\Sigma Neg_{pr\_Env\_2}}{\Sigma Trips_{pr\_Env\_2}} + \ldots + w_i \frac{\Sigma Neg_{pr\_Env\_i}}{\Sigma Trips_{pr\_Env\_i}}$$

Equation 1b, the advanced version of the first classifier, takes into account one or more specific environmental conditions that existed during prior recorded trips through the segment. For example, a first environmental condition could be a type and/or amount of precipitation, a second environmental condition could be a speed and/or direction of wind, a third environmental condition could be an amount or range of ambient light, a fourth environmental condition could be a presence or absence of fog, etc. A classifier can be trained to develop weights for respective environmental conditions. For example, weights could be developed where $\Sigma_1^i w_j = 1$.

A second classifier can determine a probability that current environmental conditions are affecting whether a vehicle computer 110 can continue to operate the vehicle 105 in a road segment in a map area without one or more occupant inputs after input-free operation has been commenced and while input-free operation is ongoing. Put another way, the second classifier can determine a probability of a minimum risk maneuver event MRM, in a road segment at a current time Minimum risk maneuver events can result from inadequate or impaired sensor 115 data, e.g., precipitation, fog, etc., can affect ability of a camera sensor 115 to detect road lane markings. However, minimum risk maneuver events can also occur even when sensor 115 data is substantially complete and reliable, e.g., when slippery conditions cause poor road traction, when road lane markings are simply not present, etc. Accordingly, even if the first classifier indicates that a road segment as available for input-free operation, it is also desirable to implement the second classifier to determine a probability of a minimum risk maneuver event in the segment.

A minimum risk maneuver event is defined in this disclosure as an event in which a vehicle 105 computer 110, without user input, changes a source of control of one or more vehicle components 120 based on sensor 115 data, and/or takes control of one or more vehicle components 120 in response to an identified risk or hazard. For example, a minimum risk maneuver can be an event in which an occupant of a vehicle 105 provides input to override computer 110 operation, e.g., by placing hands on a steering wheel to control steering (also referred to as a "hard takeover event"). For example, a minimum risk maneuver in a level 3 system (referring to the levels discussed above) could be to pull over to the shoulder of the road and flash lights, for a level 2 system, could be to return control to a vehicle 105 operator, etc.

Examples of training classifiers in the present context could include tagging a example scenarios determined to have various types of sensing results, e.g., good conditions sensed in good conditions, good conditions sensed in bad conditions, etc., whereupon the results could be clustered (perhaps with Principal Component Analysis or Locally Linear Embedding to reduce dimensionality) to look for overall patterns. Alternatively, rules based on manual tagging could be used to determine if a pair of sensing results and true environmental conditions mean sensor error or truly inappropriate conditions for input-free driving.

A naïve version of the second classifier is shown in Equation 2a.

$$P(MRM_{cur} \mid Env, seg) = \frac{\Sigma MRM_{pr\_Env}}{\Sigma Trips_{pr\_Env}} \quad (2a)$$

That is, the second classifier can determine a probability of a minimum risk maneuver event MRM at a current time, i.e., a probability that a road segment is suitable for input-free operation at the current time, given a set of one or more environmental conditions Env in the segment. $\Sigma MRM_{pr\_Env}$ is a number (typically a sum, as indicated) of previous minimum risk maneuver events HTO given the set of environmental conditions Env, and is divided by a total number of prior trips $\Sigma Trips_{pr\_Env}$ through the segment for which a determination of availability for input-free operation was made given the set of environmental conditions Env.

An advanced version of the second classifier is shown in Equation 2b.

$$P(MRM_{cur} | Env, seg) = \\ w_1 \frac{\Sigma MRM_{pr\_Env\_1}}{\Sigma Trips_{pr\_Env\_1}} + w_2 \frac{\Sigma MRM_{pr\_Env\_2}}{\Sigma Trips_{pr\_Env\_2}} + \ldots + w_i \frac{\Sigma MRM_{pr\_Env\_i}}{\Sigma Trips_{pr\_Env\_i}} \quad (2b)$$

Equation 2b, the advanced version of the second classifier, as with the advanced version of the first classifier, takes into account, including possibly providing different respective weights for, each of one or more specific environmental conditions that existed during prior recorded trips through the segment.

The first and second classifiers could be even more advanced or detailed than shown above. For example, presence or absence of specific types of sensors 115 could be included in a classifier, i.e., some sensors 115 may be more reliable and/or may perform better or worse in various environmental conditions than other sensors. For example, an infrared sensor 115 may perform better at night, i.e., under darker ambient light conditions, then a camera sensor 115 that depends on visible light. Yet further, vehicle state information, e.g., vehicle speed, availability of four wheel drive or all-wheel drive as opposed to two wheel drive, etc., could be taken into account in a classifier.

Figure 3:
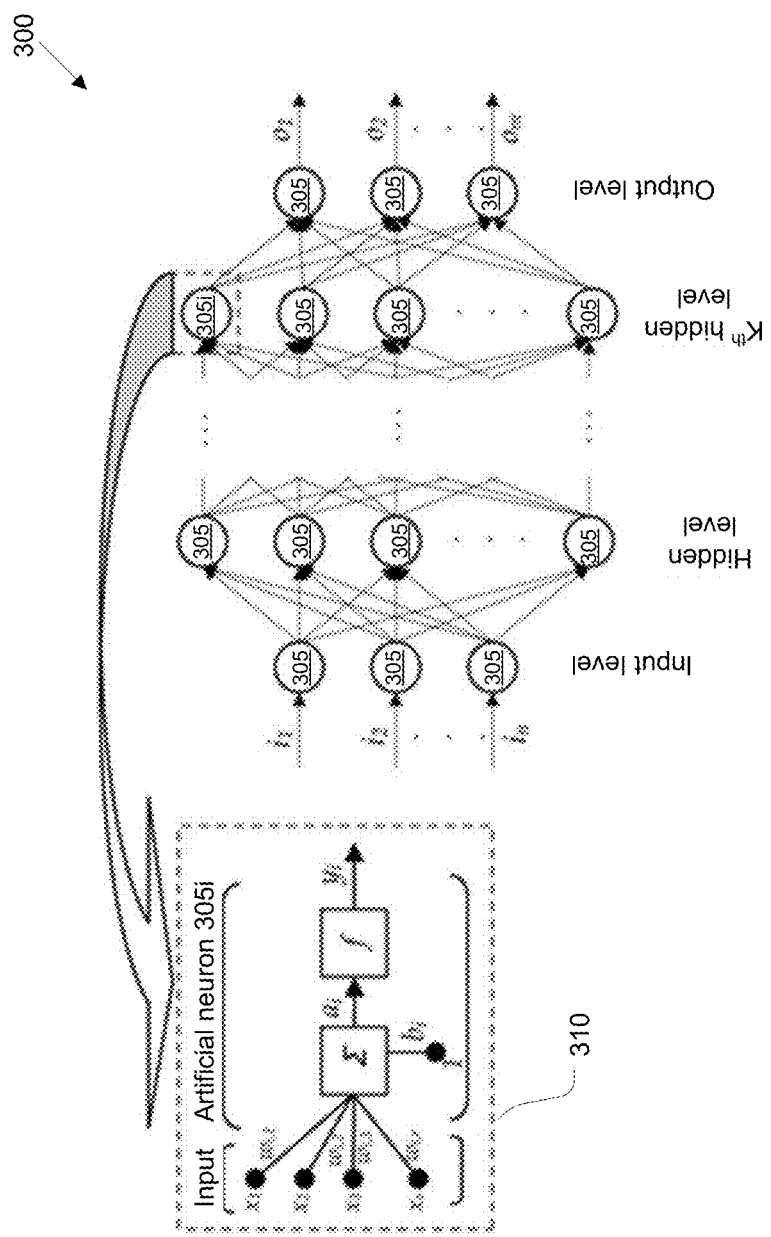
FIG. 3 is a diagram of an example deep neural network.

Probabilistic classifiers can be developed according to a machine learning program. FIG. 3 is a diagram of an example deep neural network (DNN) 300. The DNN 300 can be a software program that can be loaded in memory and executed by a processor included in computer 110, 175, for example. The DNN 300 can include n input nodes 305, each accepting a set of inputs i (i.e., each set of inputs i can include on or more inputs x). The DNN 300 can include m output nodes (where m and n may be, but typically are not, a same number) provide sets of outputs $o_1 \ldots o_m$. The DNN 300 includes a plurality of layers, including a number k of hidden layers, each layer including one or more nodes 305. The nodes 305 are sometimes referred to as artificial neurons 305, because they are designed to emulate biological, e.g., human, neurons. The neuron block 310 illustrates inputs to and processing in an example artificial neuron 305$i$. A set of inputs $x_1 \ldots x_r$ to each neuron 305 are each multiplied by respective weights $w_{i1} \ldots w_{ir}$, the weighted inputs then being summed in input function $\Sigma$ to provide, possibly adjusted by a bias $b_i$, net input $a_i$, which is then provided to activation function $f$, which in turn provides neuron 305$i$ output $y_i$. (It will be understood that weights used in the DNN300 are different than the weights discussed above in the probabilistic classifiers that can results from the DNN 300. The activation function $f$ can be a variety of suitable functions, typically selected based on empirical analysis. As illustrated by the arrows in FIG. 3, neuron 305 outputs can then be provided for inclusion in a set of inputs to one or more neurons 305 in a next layer.

The DNN 300 can be trained to accept as inputs sensor 115 data, e.g., data collected from one or more vehicle' 105 CAN busses or other networks, and to output estimated weights for various environmental conditions, e.g., as shown in the classifiers discussed above. The DNN 300 can be trained with ground truth data, i.e., data about a real-world condition or state. Weights w can be initialized by using a Gaussian distribution, for example, and a bias b for each node 305 can be set to zero. Training the DNN 300 can including updating weights and biases via conventional techniques such as back-propagation with optimizations. Example initial and final (i.e., after training) parameters (parameters in this context being weights w and bias b) for a node 305 in one example were as follows:

TABLE 1

| Parameters | Initial value | Final value |
|---|---|---|
| $w_1$ | 0.902 | −0149428 |
| $w_2$ | −0.446 | −0.0102792 |
| $w_2$ | 1.152 | 0.00850074 |
| $w_r$ | 0.649 | 0.00249599 |
| $b_i$ | 0 | 0.00241266 |

A set of weights w for a node 305 together are a weight vector for the node 305. Weight vectors for respective nodes 305 in a same layer of the DNN 300 can be combined to form a weight matrix for the layer. Bias values b for respective nodes 305 in a same layer of the DNN 300 can be combined to form a bias vector for the layer. The weight matrix for each layer and bias vector for each layer can then be used in the trained DNN 300.

In the present context, the ground truth data used to train the DNN 300 typically includes various environmental conditions and vehicle states (e.g., speed), for a reference location 205, Table 2 below identifies possible inputs to the DNN 300:

TABLE 2

| Input | Definition | Data type |
|---|---|---|
| Daylight | Is the vehicle 105 traveling in normal daylight conditions | binary |
| Rain | Is rain falling? | binary |
| Snow | Is snow falling? | binary |
| Fog | Is fog present? | binary |
| Construction | Is the location 205 in a construction zone? | binary |
| Debris | A rating indicating an amount of debris such as rocks, gravel, branches, etc., on a roadway, e.g., could be a scale of 0 to 10 where 0 means no debris, and 10 means a road is wholly impassable. | integer |
| Ambient temperature | Ambient (outside) air temperature, typically in degrees centigrade, at a location 205 | real number |
| Vehicle speed | Rate of forward motion, e.g., measured in kilometers or miles per hour | real number |
| Vehicle drive configuration | Whether a vehicle is two-wheel drive (front or rear), all-wheel-drive, four-wheel drive, etc. | integer |

Figure 5:
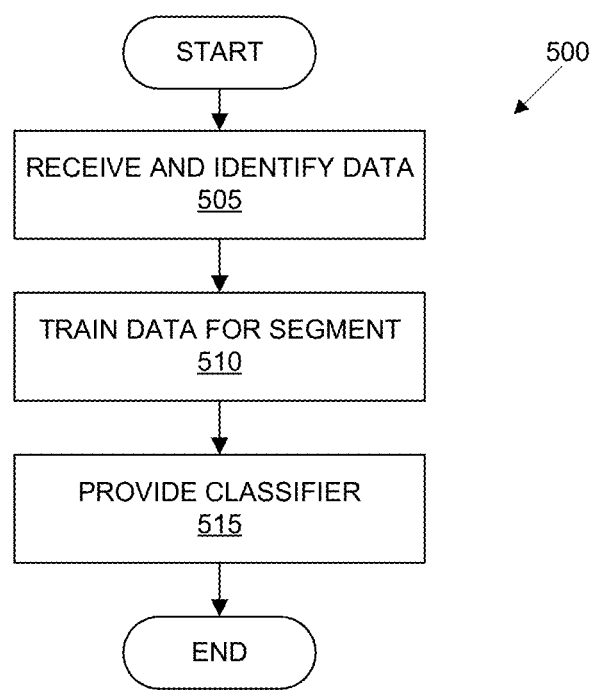
FIG. 5 is a flowchart of an exemplary process for training a classifier.

Thus, a DNN 300 could be trained by obtaining data specifying inputs such as above along with respective environmental conditions associated with various combinations of inputs. For example, it is possible to label combinations of environmental conditions that have various types of sensing results (good conditions sensed in good conditions, good conditions sensed in bad conditions, etc.) and cluster these combinations in a few spaces (e.g., with Principal Component Analysis or Locally Linear Embedding to reduce dimensionality) to identify overall patterns. Alternatively, by way of further example, rules based on manual tagging could determine if a pair of sensing results and true environmental conditions mean sensor error or truly inappropriate conditions for input-free driving. FIG. 5, discussed below, illustrates an example process 500 for training a DNN 300 to obtain a classifier such as the first and second classifiers described herein.

FIG. 400 is a flowchart of an exemplary process 400 for operating a vehicle 105, including determining a vehicle 105 mode of operation with respect to a reference location 205 map area. The process 400 can use a map 200 as described above. The map 200 can be accessed in substantially real time from a remote server 145 and/or can be downloaded and stored in a memory local to the computer 110. The process 400 can be initiated according to instructions in the computer 110 upon computer 110 boot up, e.g., when a vehicle 105 is powered on, and/or according to user input.

As a non-limiting summary of the process 400, before specific process blocks are described in further detail, the process 400 can include operating a vehicle 105 and identifying a map 200 area in which the vehicle 105 is operating (block 405); obtaining output from a first classifier, based on input including the map area and a current environmental condition, specifying a first probability that the map area is currently available for sensing to support input-free operation of the vehicle (block 410); then, if and only if the first probability indicates that the map area is currently available for sensing to support input-free operation of the vehicle, obtaining output from a second classifier, based on input including the map area and the current environmental condition, specifying a second probability that the vehicle will traverse the map area without a minimum risk maneuver event (block 415); and then, if and only if the second probability indicates that the vehicle will traverse the map area without a minimum risk maneuver event, operating the vehicle in an input-free mode (i.e., an assist mode) in the map area (block 420). The process 400 can further include, while operating in the input-free mode, determine detect that a minimum risk maneuver event has occurred (block 425); and upon detecting the minimum risk maneuver event and/or upon determining that the vehicle 105 has exited the map 200 area (block 430), provide data about the traversal of the map 200 area to a cloud server such as the server 435 (block 435).

Figure 4:
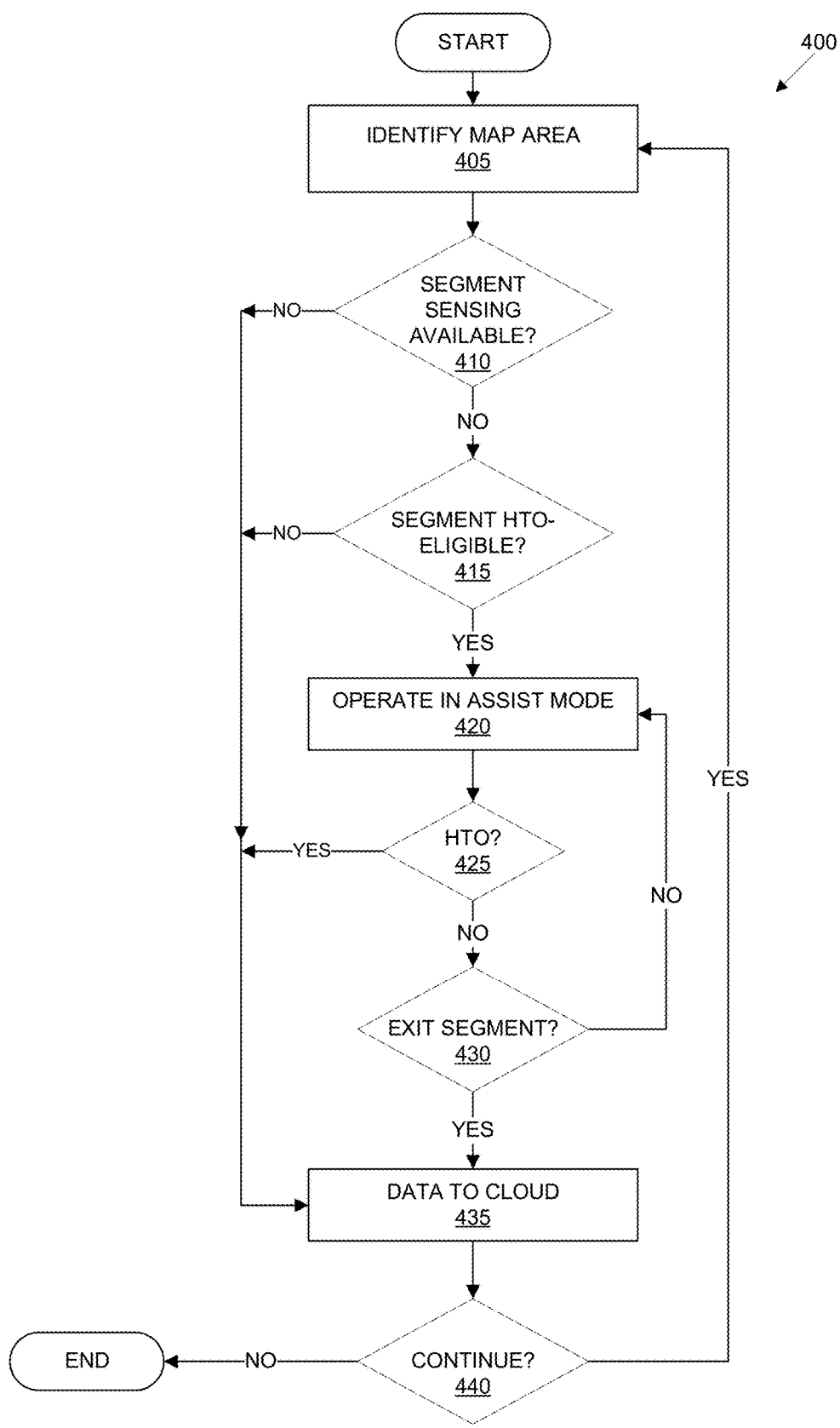
FIG. 4 is a flowchart of an exemplary process for operating a vehicle.

The process 400 can begin in a block 405, in which a vehicle 105 computer 110 identifies a map area in which the vehicle 105 is presently operating. That is, the computer 110 can receive a geolocation or the like (e.g., a latitude, longitude pair of geographic coordinates) from a GPS sensor 115. Then, upon determining a closest reference location 205 to the received geolocation, the computer 110 can identify a current map area that includes a road segment on which the vehicle 105 is operating. Further, although not shown in FIG. 4, the process 400 could include the computer 110 checking data in a map 200 for a current reference location 205 to determine whether a current map area, i.e., a current road segment, includes a specification that input-free operation is possible in the map area. The process 400 could pause until a next road segment is reached, or could and, if it is determined that the current road segment includes a specification that input-free operation is not possible in the map area including the road segment.

Next, in a block 410, the computer 110 inputs the reference location 205 along with one or more environmental conditions to the first classifier in either a naïve or advanced version as described above, and obtains as output from the first classifier a determination that the road segment being traversed in the current map area is or is not available for input-free operation based on the probability output by the first classifier that sensors 115 can reliably sense an environment around the vehicle 105 given current environmental conditions. For example, a computer 110 programmed to steer a vehicle 105 will typically determine a path, typically in the form of a steerable path polynomial, and will determine a confidence in the steerable path polynomial. The computer 110 will further typically be programmed to allow hands-free operation if the confidence exceeds a predetermined threshold; this threshold can also be used to evaluate the output of the first classifier. If the determination is negative, e.g., the output of the first classifier is lower than a confidence threshold, then the process 400 proceeds to a block 435. If the determination is positive, i.e., the road segment currently being traversed, i.e., the current map area of the vehicle 105, is available for input-free operation based on a probability of reliability of sensors 115, e.g., the output of the first classifier is higher than a confidence threshold, then the process 400 proceeds to a block 415.

In the block 415, the computer 110 inputs the reference location 205 along with one or more environmental conditions to the second classifier in either a naïve or advanced version as described above, and obtains as output from the second classifier a probability of a minimum risk maneuver event (MRM) on the current road segment, i.e., in the current map area of the vehicle 105. A vehicle 105 manufacturer can establish a threshold at which at minimum risk maneuver event is deemed probable, and the threshold could be below a 50% probability some approaches, e.g., 5%, 10%, etc. Further, a probability could be adjusted based on an amount of available data under current conditions for the current map area, e.g., the threshold could be lower if the probability was based on less data, e.g., a lower number of traversals of vehicles 105. If a minimum risk maneuver event is probable, then the process 400 proceeds to the block 435; but if a minimum risk maneuver event is not probable, the process 400 proceeds to a block 420.

In the block 420, the computer 110 operates the vehicle 105 in an assist mode, i.e., input-free operation such as a mode in which a user may not provide steering input, e.g., can have hands off a vehicle 105 steering wheel.

Following the block 420, in a block 425, the computer 110 determines whether a minimum risk maneuver has occurred. If yes, the process 400 proceeds to the block 435. Otherwise, in a block 430, the computer 110 determines, e.g., based on geo-location data such as described above, whether the vehicle 105 has exited a current segment, i.e., has proceeded from a first map area to a second map area. If so, the process 400 proceeds to the block 435. Otherwise, the process 400 continues in the block 420. That is, when the vehicle 105 is operating in an assist mode, the computer 105 can execute the block 425, 430 sequentially, substantially in parallel, or in a different order or timing to determine whether a minimum risk maneuver event has occurred and/or the vehicle 105 has exited a current road segment.

In the block 435, which may follow any of the blocks 410, 415, 425, 430, the computer 110 provides data for the current or just-exited road segment, i.e., map area, to a remote server 145, sometimes referred to as a cloud server 145 because it is typically accessed via the wide area or cloud network 135. The data for the road segment provided to the server 145 includes environmental conditions data such as described above, i.e., data detected by sensors 115 while the vehicle 105 was traversing the road segment, as well as data specifying whether the vehicle 105 operated in an assist mode in the road segment and, if the vehicle did operate in an assist mode in the road segment, whether there was or was not a minimum risk maneuver event in the road segment.

Following the block 435, in a block 440, the computer 110 determines whether the process 400 is to continue. For example, the vehicle 105 could be powered down or stopped, user input could be received to end input-free operation, etc., whereupon the process 400 could end. Alternatively or additionally, where the iteration of the block 435 preceding a current iteration of the block 440 was reached from any of the blocks 410, 415, 425, the computer 110 could pause the process 400 while the vehicle 105 is moving until the vehicle 105 has exited a current segment, i.e., moved from a segment being traversed while the blocks 410, 415, 425 were being executed, to a new segment, i.e., from a first map area to a second map area. Likewise, as described above, the process 400 could be paused while the vehicle 105 is traversing a road segment specified as not available for input-free operation in a map 200. If and when the process 400 is to continue rather than end following the block 440, the process 400 returns to the block 405.

FIG. 5 is a flowchart of an exemplary process 500 for training a machine learning program such as a DNN 300 to obtain a classifier such as the first as second classifiers discussed above. The process 500 can be executed at a computer such as a remote server 145.

In a block 505, the remote server 145 receives data from one or more vehicles 105, e.g., as described above concerning the process 400, as or after a vehicle 105 traverses a road segment, the vehicle 105 can provide data about the segment including environmental conditions data and/or other data such as a time of day, information about the vehicle 105 such as a speed, etc., where the label is data concerning whether a minimum risk maneuver did or did not occur as the vehicle 105 traversed the road segment. The remote server 145 can collect such data from vehicles 105 four one or more areas in a map 200.

In a block 510, data received in the block 505 can be used to train first and/or second classifiers described above. Typically the data is used to train a classifier for a specified map area, i.e., a map area in which the data was obtained by a vehicle 105. A classifier can be trained as described above.

In a block 515, the classifier can be provided for use. For example, a classifier can be included in data for a map 200, i.e., specified for an area defined with respect to a reference location 205 in the map 200.

Following the block 515, the process 500 ends.

As used herein, the word "substantially" means that a shape, structure, measurement, quantity, time, etc. may deviate from an exact described geometry, distance, measurement, quantity, time, etc., because of imperfections in materials, machining, manufacturing, transmission of data, computational speed, etc. The word "substantial" should be similarly understood.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
    operating a vehicle in an identified map area;
    obtaining output from a first classifier, based on input including the map area and one or more current environmental conditions detected in the map area, specifying a first probability that the map area is currently available for sensing to support input-free operation of the vehicle;
    determining whether the first probability indicates that the map area is currently available for sensing to support input-free operation of the vehicle;
    then, if the first probability indicates that the map area is currently available for sensing to support input-free operation of the vehicle, obtaining output from a second classifier, based on input including the map area and the one or more current environmental conditions, specifying a second probability that the vehicle will traverse the map area without a minimum risk maneuver event;
    determining whether the second probability indicates that the vehicle will traverse the map area without a minimum risk maneuver event; and
    then, if the second probability indicates that the vehicle will traverse the map area without a minimum risk maneuver event, operating the vehicle in an input-free mode in the map area.

2. The method of claim 1, further comprising providing the one or more current environmental conditions to a remote server for updating the first classifier and the second classifier.

3. The method of claim 1, further comprising providing a detected minimum risk maneuver event to a remote server for updating the first classifier and the second classifier.

4. The method of claim 1, further comprising ending the input-free mode upon a detected minimum risk maneuver event.

5. The method of claim 1, wherein the first classifier and the second classifier include different weights for different environmental conditions.

6. The method of claim 1, wherein the first classifier and the second classifier accept vehicle state data as input in addition to the one or more current environmental conditions.

7. The method of claim 1, wherein the first classifier and the second classifier accept a type of sensor as input in addition to the one or more current environmental conditions.

8. The method of claim 1, wherein the first classifier and the second classifier are outputs from a trained neural network.

9. The method of claim 1, wherein the one or more environmental conditions is one and only one environmental condition.

10. The method of claim 1, wherein the one or more environmental conditions include at least one of an air temperature, a wind speed, a wind direction, an amount of ambient light, a presence or absence of precipitation, a rate of precipitation, or a presence or absence of atmospheric occlusions affecting visibility.

11. A computer comprising a processor and a memory, the memory storing instructions executable by the processor such that the computer is programmed to:
    operate a vehicle in an identified map area;
    obtain output from a first classifier, based on input including the map area and one or more current environmental conditions detected in the map area, specifying a first probability that the map area is currently available for sensing to support input-free operation of the vehicle;
    determine whether the first probability indicates that the map area is currently available for sensing to support input-free operation of the vehicle;
    then, if the first probability indicates that the map area is currently available for sensing to support input-free operation of the vehicle, obtain output from a second classifier, based on input including the map area and the one or more current environmental conditions, specifying a second probability that the vehicle will traverse the map area without a minimum risk maneuver event;
    determine whether the second probability indicates that the vehicle will traverse the map area without a minimum risk maneuver event; and
    then, if the second probability indicates that the vehicle will traverse the map area without a minimum risk maneuver event, operate the vehicle in an input-free mode in the map area.

12. The computer of claim 11, the instructions further comprising instructions to provide the one or more current environmental conditions to a remote server for updating the first classifier and the second classifier.

13. The computer of claim 11, the instructions further comprising instructions to provide a detected minimum risk maneuver event to a remote server for updating the first classifier and the second classifier.

14. The computer of claim 11, the instructions further comprising instructions to end the input-free mode upon a detected minimum risk maneuver event.

15. The computer of claim 11, wherein the first classifier and the second classifier include different weights for different environmental conditions.

16. The computer of claim 11, wherein the first classifier and the second classifier accept vehicle state data as input in addition to the one or more current environmental conditions.

17. The computer of claim 11, wherein the first classifier and the second classifier accept a type of sensor as input in addition to the one or more current environmental conditions.

18. The computer of claim 11, wherein the first classifier and the second classifier are outputs from a trained neural network.

19. The computer of claim 11, wherein the one or more environmental conditions is one and only one environmental condition.

20. The computer of claim 11, wherein the one or more environmental conditions include at least one of an air temperature, a wind speed, a wind direction, an amount of ambient light, a presence or absence of precipitation, a rate of precipitation, or a presence or absence of atmospheric occlusions affecting visibility.

* * * * *